(12) United States Patent
Matsunaga et al.

(10) Patent No.: US 6,724,985 B2
(45) Date of Patent: Apr. 20, 2004

(54) HOT-WATER HEATING APPARATUS FOR ELECTRIC VEHICLE AND HYBRID VEHICLE

(75) Inventors: Ken Matsunaga, Kariya (JP); Yuji Takeo, Toyoake (JP); Kenichi Hasegawa, Sanjo (JP); Susumu Kazama, Sanjo (JP); Yoshihiko Adachi, Sanjo (JP)

(73) Assignees: Denso Corporation, Kariya (JP); Corona Corporation, Sanjo (JP)

( * ) Notice: Subject to any disclaimer, the term of this patent is extended or adjusted under 35 U.S.C. 154(b) by 0 days.

(21) Appl. No.: 10/214,215

(22) Filed: Aug. 7, 2002

(65) Prior Publication Data

US 2003/0029926 A1 Feb. 13, 2003

(30) Foreign Application Priority Data

Aug. 8, 2001 (JP) ........................................ 2001-240225

(51) Int. Cl.⁷ ................................................. F24H 1/10
(52) U.S. Cl. ..................... 392/480; 392/482; 219/530
(58) Field of Search ................... 392/465, 466, 392/467, 469, 480, 481, 482; 219/530

(56) References Cited

U.S. PATENT DOCUMENTS

| 3,953,923 A | * | 5/1976 | Rygmyr | 29/611 |
|---|---|---|---|---|
| 4,303,826 A | * | 12/1981 | Ando | 392/469 |
| 4,303,827 A | * | 12/1981 | Kyles | 219/512 |
| 4,325,293 A | * | 4/1982 | Bleckmann | 99/300 |
| 4,356,381 A | * | 10/1982 | Flaherty et al. | 392/467 |
| 4,778,977 A | * | 10/1988 | Bleckman | 392/480 |
| 4,825,042 A | * | 4/1989 | Hauslein | 392/467 |
| 6,327,429 B1 | * | 12/2001 | Chan | 392/483 |

FOREIGN PATENT DOCUMENTS

JP          10-287123         10/1998

\* cited by examiner

*Primary Examiner*—Edward K. Look
*Assistant Examiner*—Thor Campbell
(74) *Attorney, Agent, or Firm*—Harness, Dickey & Pierce, PLC

(57) ABSTRACT

A hot water heating apparatus for an electric vehicle and a hybrid vehicle has a compact heat source apparatus not requiring a wide space for setting. A communication pipe, in which water as a heat medium flows, and an electric heater are embedded in a heat conductor metal in proximity in a row arrangement to form a flat-shaped heat conductor. A heat source apparatus is constructed by stacking multiple flat-shaped heat conductors while the communication pipes are connected to each other in series. Further, the communication pipe and the electric heater are embedded in the heat conductor metal in proximity in a row arrangement, and the communication pipes are connected in series. Therefore, water flowing in the communication pipes is rapidly heated, and heating efficiency is extremely high.

13 Claims, 3 Drawing Sheets

HOT-WATER HEATING APPARATUS FOR ELECTRIC VEHICLE AND HYBRID VEHICLE

CROSS REFERENCE TO RELATED APPLICATION

This application is based upon, claims the benefit of priority of, and incorporates by reference the contents of prior Japanese Patent Application No. 2001-240225, filed Aug. 8, 2001.

BACKGROUND OF THE INVENTION

1. Technical Field of the Invention

The present invention relates to a heating apparatus for an electric vehicle and a hybrid vehicle, and more particularly, to a heat source apparatus such as an electric heater for heating water.

2. Description of Related Art

In JP-A-10-287123, water is heated by a heat source apparatus in which a coil-shape electric heater is disposed in a hot water tank that stores hot water. The heated water (hot water) is circulated into a heat exchanger, where heat-exchange is performed between the hot water and forced air. The heated air is supplied to a passenger compartment, thereby performing heating operation in an electric vehicle.

However, in the conventional apparatus, since a hot water tank for storing hot water is used as a heat source apparatus, a lot of space is required to store the apparatus. In an electric vehicle which includes many parts, there is not a lot of space for setting the conventional apparatus. Further, since a large amount of water is required to be heated by a single electric heater, heating efficiency is low, and a long time is required for increasing the temperature of the water.

SUMMARY OF THE INVENTION

The present invention solves the above-described problem. In one aspect of the invention, a hot-water heating apparatus includes a heat source apparatus constructed by multiple, stacked, flat heat conductors. Further, a communication pipe that contains water as a heat medium, and an electric heater, are arranged in proximity to each other in rows. Additionally, both are embedded in a heat conductor metal, thereby forming each flat heat conductor. The communication pipes in the multiple heat conductors are connected in series.

Accordingly, the heat source apparatus, constructed as an assembly of flat heat conductors, is compact and does not require a wide space or a lot of space for installation. Further, the communication pipe and the electric heater are located proximate to each other and embedded in the heat conductor metal in a row-like arrangement. The communication pipes in different heat conductor metals are connected to each other in series. Therefore, water flowing in the communication pipes is heated rapidly, and heating efficiency is extremely high.

Continuing, each of the communication pipes and the electric heaters is formed in a U-shape, and the electric heater is disposed inside the U-shaped loop or perimeter of the communication pipe in each heat conductor metal. Therefore, although each heat conductor is compact, production cost is reduced by making a length of the electric heater as short as possible. At the same time, heating efficiency is improved by making a heat conduction distance as long as possible. Here, the heat conduction distance corresponds to a length along the U-shaped electric heater.

Heat insulation clearance is provided between neighboring heat conductors. This prevents heat conduction therebetween and ensures uniform temperature distribution of each heat conductor. Finally, each heat conductor includes a superheating prevention device to prevent each heat conductor from melting.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
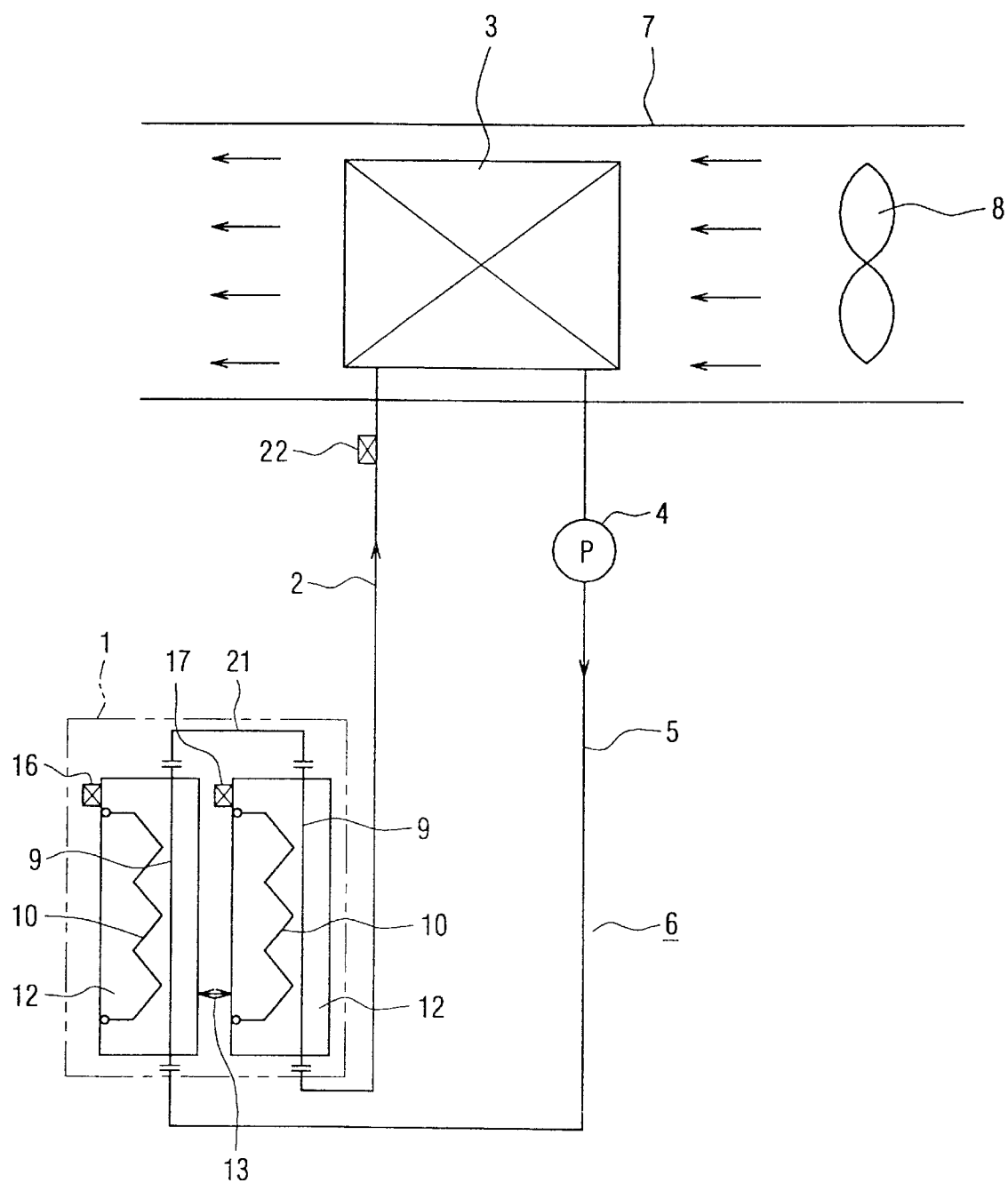
FIG. 1 is a schematic view showing a hot-water heating apparatus for an electric vehicle and a hybrid vehicle.

Next, a hot-water heating apparatus for an electric vehicle and a hybrid vehicle according to the present invention will be described with reference to an example shown in the drawings.

In FIG. 1, a heat source apparatus 1 heats water as a heat medium, and the heated water (high-temperature hot water) is supplied to a hot-water heat exchanger 3 by a circulation pump 4 through an approach pipe 2. The hot water, cooled in the hot-water heat exchanger 3, is returned to the heat source apparatus 1 by the circulation pump 4 through a return pipe 5. The circulation circuit 6 for hot water is constructed by the above components.

The hot-water heat exchanger 3, disposed in an air duct 7, heats air blown by a blower fan 8 across the heat exchanger 3 using heat-exchange. The heated air (warm air) is supplied into a passenger compartment to perform heating operation for an electric vehicle.

Figure 5:
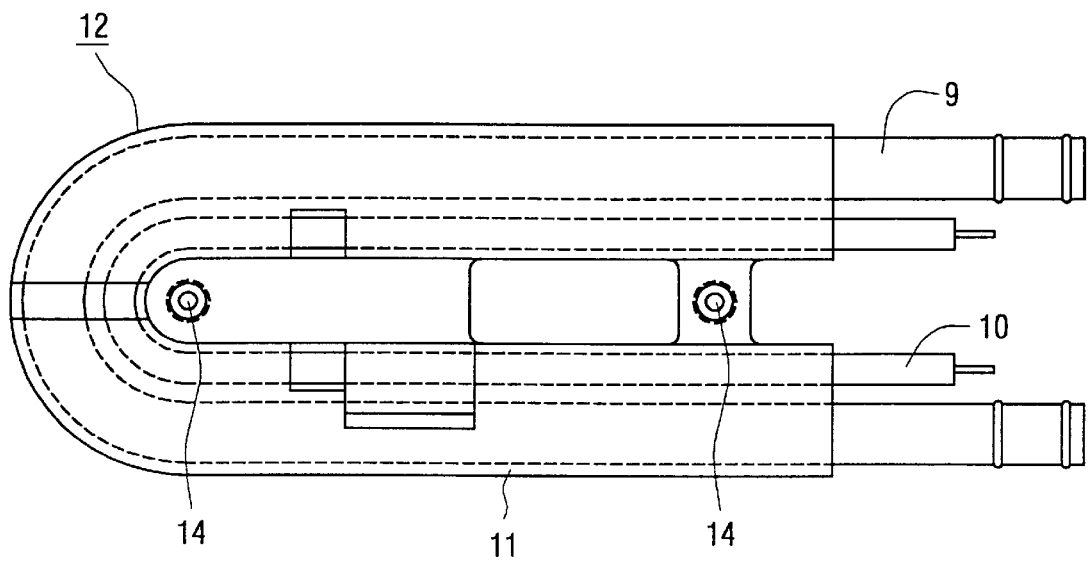
FIG. 5 is a plan view showing a heat conductor.

In FIGS. 1 and 5, each communication pipe 9 is formed by bending a stainless pipe into a U-shape. Hot water flows in the communication pipe 9. An electric heater 10 is formed by a sheath heater, having a capacity of 288V and 1.5 KW, which is bent into a U-shape. As shown in FIG. 5, a die-cast heat conductor 12 is formed into a flat shape. The communication pipe 9 encompasses the electric heater 10, while both the communication pipe 9 and the electric heater 10 are embedded in a heat-conductor metal 11 made of aluminum. The heat source apparatus 1 is constructed by stacking two heat conductors 12 in an up-down (vertical) direction.

Figure 4:
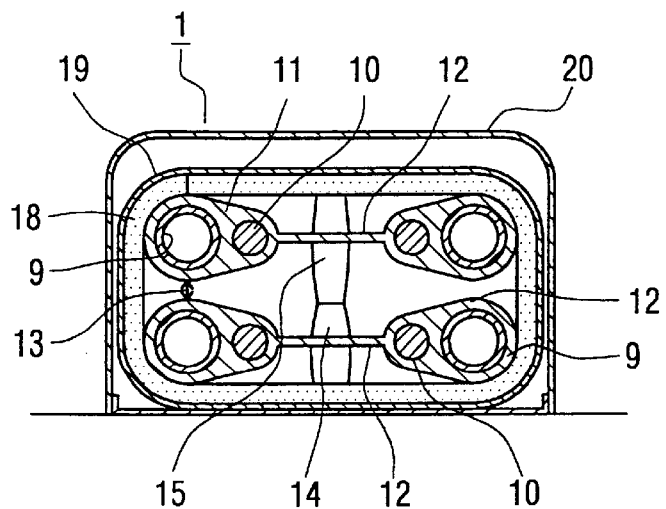
FIG. 4 is a cross-sectional view showing the heat source apparatus.

In FIGS. 1 and 4, projections 14 and 15, formed on the heat conductors 12, contact each other to provide a heat insulation clearance 13 between the heat conductors 12. The heat insulation clearance 13 prevents heat concentration from being generated by heat conduction due to the contact between the heat conductors 12, thereby uniformly distributing the temperature of each heat conductor 12.

Each of superheating prevention devices 16 and 17, constructed by a thermal fuse, is provided in each heat conductor 12. Here, each of the superheating prevention devices 16 and 17 is blown at 185° C. to stop the energizing of the electric heater 10. Therefore, since the temperature of each heat conductor 12 can be prevented from abnormally increasing, each heat conductor 12 can be prevented from melting and subsequently failing.

In FIG. 4, two stacked heat conductors 12 are covered and heat-insulated by a heat insulation material 18, including an aluminum foil 19 attached to its surface, and a case 20 disposed outside the heat insulation material 18.

Figure 2:
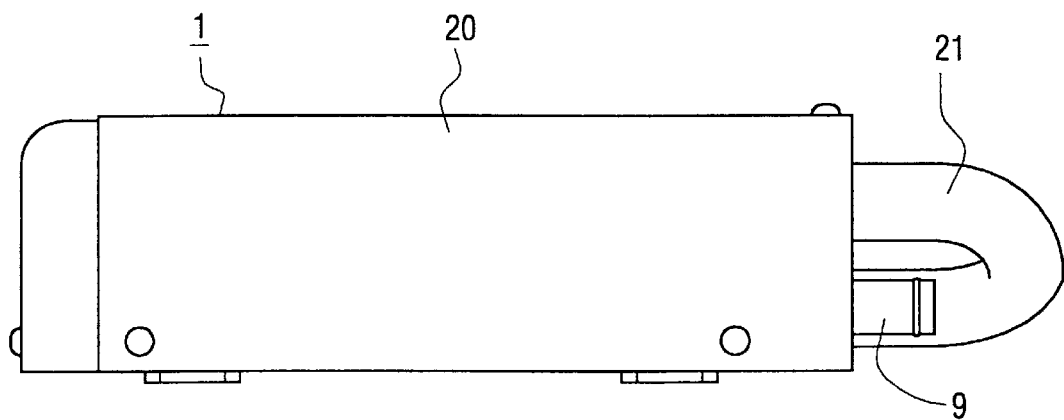
FIG. 2 is a side view showing a heat source apparatus.
Figure 3:
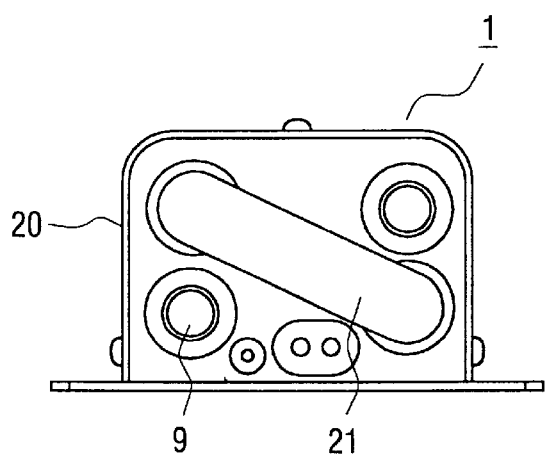
FIG. 3 is a front view of the heat source apparatus.

In FIGS. 1–3, a connection pipe 21, formed by a rubber tube, connects an outlet of the communication pipe 9 of the heat conductor 12 at a lower stage and an inlet of the communication pipe 9 of the heat conductor 12 at an upper stage. The communication pipes 9 are connected in series to each other by the connection pipe 21. A temperature sensor 22, disposed on the approach pipe 2, detects a temperature of hot water, and is used to control the circulation pump 4 and the electric heaters 10.

Next, operation of an example of the present invention will be described. When water in the circulation circuit 6 is circulated into the heat source apparatus 1 by driving the circulation pump 4, the water flows into the communication pipe at the lower stage. Then, the water flows into the communication pipe 9 at the upper stage through the connection pipe 21, and flows out of an outlet of the communication pipe 9 at an opposite side of the connection pipe 21. The water is heated to a high-temperature while flowing through the communication pipes 9, and is supplied to the hot-water heat exchanger 3.

Then, air blown by the blower fan 8 is heat-exchanged with the hot water in the hot-water heat exchanger 3, and is supplied as warm air into a passenger compartment, thereby suitably heating the passenger compartment.

The hot water, cooled by heat-exchange in the hot-water heat exchanger 3, is again circulated into the heat source apparatus 1 through the return pipe 5, so that the water can again be heated. The circulation is repeated in order. If any one of the electric heaters 10 cannot be controlled while this operation is performed, the superheating prevention device 16 or 17, detects the uncontrollable operation, and is blown (triggered), thereby surely preventing the heat conductors 12 from being melted.

Accordingly, the heat source apparatus 1, constructed by stacking the flat-shaped heat conductors 12 at two stages, is compact and does not require a wide space for setting. Further, the communication pipe 9 and the electric heater 10 are embedded in each heat conductor metal 11, in proximity, in a row arrangement. The communication pipes 9, in different heat conductor metals 11, are connected to each other in series. Therefore, water flowing in the communication pipes 9 is heated rapidly, and heating efficiency is extremely high.

In the heat conductor 12, each of the communication pipe 9 and the electric heater 10 is formed as a U-shape, and the electric heater 10 is disposed inside the loop or perimeter of the communication pipe 9. Therefore, although the heat conductor 12 is compact, production costs are reduced by making a length of the electric heater 10 as short as possible while heating efficiency is improved by making a heat conduction distance as long as possible. Here, the heat conduction distance corresponds to a length along the U-shaped electric heater 10.

Further, thermal conduction is prevented between the heat conductors 12 by providing a heat insulation clearance 13 between the heat conductors 12. This ensures uniform temperature distribution of each heat conductor 12, for suitably heating water. Each of the super heating prevention devices 16 and 17 is provided in each heat conductor 12, thereby surely preventing each heat conductor 12 from melting.

Figure 6:
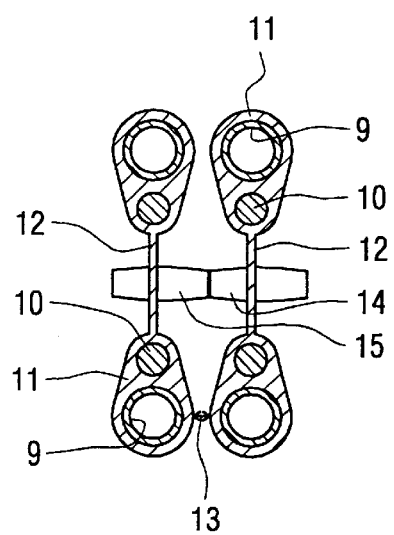
FIG. 6 is a cross-sectional, explanation view showing heat conductors stacked in a different direction in another example.

Although the heat conductors 12 are stacked at two stages in an up-down (vertical) direction in this example, they can be stacked more than two at multiple stages if required. Further, as shown in FIG. 6, they can be stacked in a lateral direction without being limited to the up-down direction, thereby also obtaining the same effects.

As described above, according to the present invention, the heat source apparatus, constructed by stacking the flat-shaped heat conductors, is compact, and does not require a lot of space for setting. Further, the communication pipe 9 and the electric heater 10 are embedded in each heat conductor metal 11 in proximity in a row arrangement, and the communication pipes 9 in the different heat conductor metals 11 are connected to each other in series. Therefore, water flowing in the communication pipes 9 is heated rapidly, and heating efficiency is extremely high.

Each of the communication pipe 9 and the electric heater 10 is formed as a U-shape, and the electric heater 10 is provided inside the communication pipe 9. Therefore, although the heat conductor 12 is compact, production cost is reduced by making a length of the electric heater 10 as short as possible while heating efficiency is improved by making a heat conduction distance as long as possible.

Since the heat insulation clearance is provided between the heat conductors, heat conduction can be prevented therebetween, thereby permitting a uniform temperature distribution around each heat conductor. Since the super heating prevention device is provided in each heat conductor, each heat conductor can be surely prevented from being melted.

In another aspect of a hot water heating apparatus for an electric vehicle and a hybrid vehicle, the heating apparatus contains a communication pipe 9 in which water flows as a heat medium, an electric heating tube 10, wherein electric current is passed through the heating tube 10 to heat the tube 10, and a heat conductor 12, the heat conductor 12 further comprising a first end piece and a second end piece, and a flat connector portion connecting the first end piece and the second end piece. The first end piece and the second end piece each define two holes, a first hole of each piece for containing the electric heater 10 and the second hole of each piece for containing the communication pipe 9.

The heat conductors (flat connector portions) between the first end pieces and the second end pieces are arranged adjacent to each other. The first ends of adjacent heat conductors 12 define a heat insulation clearance 13 as do the second ends. Further, a projection portion 14 or 15 lies between the flat connector portions 12 of adjacent heat conductors.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hot-water heating apparatus for an electric vehicle and a hybrid vehicle, comprising a heat source apparatus having a plurality of stacked, flat heat conductors, each flat heat conductor including:

a communication pipe in which water flows as a heat medium;

an electric heater; and a heat conductor metal in which the communication pipe and the electric heater are embedded proximate to each other in a row arrangement direction, and the communication pipes are connected in series; wherein:

each of the communication pipes and the electric heaters is formed in a U-shape; and the electric heater is disposed inside a loon formed by the communication pipe in each heat conductor metal; and the flat heat conductors are stacked in a direction perpendicular to the row arrangement direction of the communication pipe and the electric heater.

2. The hot-water heating apparatus according to claim 1, wherein neighboring heat conductors define a heat insulation clearance therebetween.

3. The hot-water heating apparatus according to claim 1, wherein each heat conductor includes a superheating prevention device.

4. The hot-water heating apparatus according to claim 2, wherein each heat conductor includes a superheating prevention device.

5. The hot-water heating apparatus according to claim 1, wherein each flat heat conductor further comprising:

a first end piece and a second end piece; and a flat connector portion connecting the first end piece and the second end piece.

6. The hot-water heating apparatus of claim 5, wherein the first end piece and the second end piece each define two holes, a first hole of each end piece for containing the electric heater and the second hole of each piece for containing the communication pipe.

7. The hot-water heating apparatus of claim 6, wherein the flat heat conductors are arranged adjacent to each other.

8. The hot-water heating apparatus of claim 7, wherein first ends of adjacent flat heat conductors define a first heat insulation clearance.

9. The hot-water heating apparatus of claim 8, wherein second ends of the adjacent flat heat conductors define a second heat insulation clearance.

10. The hot-water heating apparatus of claim 5, further comprising a projection portion located between the flat connector portions of adjacent flat heat conductors.

11. The hot-water heating apparatus according to claim 1, wherein a hot water outlet of one communication pipe is connected to a hot water inlet of another communication pipe of an adjacent flat heat conductor by a connection pipe.

12. A hot-water heating apparatus for an electric vehicle and a hybrid vehicle, comprising a heat source apparatus having a plurality of stacked, flat heat conductors, each flat heat conductor including:

a communication pipe in which water flows as a heat medium;

an electric heater; and a heat conductor metal in which the communication pipe and the electric heater are embedded proximate to each other in a row arrangement direction, and the communication pipes are connected in series wherein neighboring heat conductors define a heat insulation clearance therebetween.

13. The hot-water heating apparatus according to claim 12, wherein each heat conductor includes a superheating prevention device.

* * * * *